United States Patent [19]

Lo et al.

[11] 4,282,022
[45] Aug. 4, 1981

[54] METHOD FOR MAKING POLARIZING GLASSES THROUGH EXTRUSION

[75] Inventors: Kuang-Hsin K. Lo, Big Flats; Daniel A. Nolan, Corning, both of N.Y.

[73] Assignee: Corning Glass Works, Corning, N.Y.

[21] Appl. No.: 144,537

[22] Filed: Apr. 28, 1980

[51] Int. Cl.³ .................... C03B 17/06; C03C 3/26
[52] U.S. Cl. .................................. 65/85; 65/183; 65/DIG. 2; 106/DIG. 6
[58] Field of Search ............. 65/85, 95, 183, DIG. 2; 106/DIG. 6; 264/2

[56] References Cited

U.S. PATENT DOCUMENTS

| | | | |
|---|---|---|---|
| 3,208,860 | 9/1965 | Armistead et al. | 106/DIG. 6 |
| 3,467,513 | 9/1969 | Dockerty | 65/183 |
| 3,548,060 | 12/1970 | Suzuki et al. | 106/DIG. 6 |
| 3,653,863 | 4/1972 | Araujo et al. | 65/DIG. 2 |
| 3,703,388 | 11/1972 | Araujo et al. | 106/DIG. 6 |
| 3,834,912 | 9/1974 | Gliemeroth | 106/DIG. 6 |
| 3,876,436 | 4/1975 | Lythgoe | 106/DIG. 6 |
| 3,957,498 | 5/1976 | Reade | 106/DIG. 6 |
| 4,125,405 | 11/1978 | Araujo et al. | 106/DIG. 6 |
| 4,190,451 | 2/1980 | Hares et al. | 106/DIG. 6 |

*Primary Examiner*—Richard V. Fisher
*Attorney, Agent, or Firm*—Clinton S. Janes, Jr.

[57] ABSTRACT

The present invention relates to the preparation of polarizing glasses from silver-containing glasses characterized by the presence of metallic silver particles therein and/or by being photochromic through the inclusion of silver halide particles therein selected from the group of AgCl, AgBr, and AgI. The method contemplates extruding the glass at a temperature between the annealing and softening points of the glass at a sufficiently high applied pressure to elongate the metallic silver and/or silver halide particles to an aspect ratio of at least 2:1 and up to 30:1 and greater. The extrudate is cooled in a manner to prevent the elongated particles from resuming their original shape. Dichroic ratios of up to 5.0 are achievable where the elongated particles exhibit an oblate configuration.

9 Claims, 4 Drawing Figures

METHOD FOR MAKING POLARIZING GLASSES THROUGH EXTRUSION

BACKGROUND OF THE INVENTION

The production of polarizing materials, especially plastic materials in sheet form, is well known to the art. The production process generally comprehends two basic steps: first, light-polarizing particles are dispersed in a suspending medium; and, second, the medium is caused to flow under stress, such as by extruding, rolling, or stretching, in order to elongate the particles, where necessary, and to align the particles in the direction of medium flow. Although the vast bulk of the polarizing materials marketed commercially has utilized an organic plastic as the suspending medium with organic and/or inorganic particles and/or molecules being dispersed therewithin, because of the inherent low surface hardness, relatively high moisture susceptibility, low temperature capability, and poor scratch resistance of organic plastics, investigations have been undertaken sporadically to manufacture polarizing glasses. Such research has been most active in the field of ophthalmic applications where high surface hardness and good scratch resistance are important.

Polarizing glasses have been prepared wherein very fine metallic particles and inorganic crystals have comprised polarizing materials. Two methods for making polarizing glasses have been disclosed in the recent patent literature. U.S. Pat. No. 4,125,405 describes the preparation of photochromic polarizing glasses effected through the photolytic reduction of silver and U.S. Pat. No. 3,653,863 discloses the manufacture of polarizing glasses via stretching the glass.

The first method involves subjecting a photochromic glass, wherein a silver halide selected from the group of AgCl, AgBr, and AgI constitutes the photochromic agent, while the glass is in the darkened state to a high intensity source of linearly-polarized visible light, a laser supplying a convenient source of such radiation. The practical aspects of providing such an exposure to the glass have rendered the process intrinsically expensive and slow. Furthermore, non-photochromic silver-containing glasses cannot be made polarizing by that procedure.

The second method is also specifically directed to photochromic glasses wherein a silver halide comprises the photochromic agent. The technique contemplates stretching the photochromic glasses, while at temperatures between the annealing and softening points of the glass, to simultaneously elongate the silver halide particles to an ellipsoidal configuration (conventionally demonstrating a length-to-width ratio, conventionally termed the "aspect ratio", ranging between about 2:1–5:1) and align the elongated particles. The stretched glass is cooled quickly to inhibit the elongated particles from returning to their original shape (respheroidizing).

This stretching technique is subject to several limitations. For example, the redrawing or stretching comprehends placing the glass under high tensile stress and glass is weak in tension. Consequently, although the maximum stress typically obtainable in re-drawing is about 6000 psi, ruptures of the glass at much lower stress levels are not uncommon. Inasmuch as the polarizing character of the stretched glass is dependent upon the maximum stress during re-drawing, premature ruptures not only interrupt the process but create undesirable rejects. Another problem not infrequently encountered in the re-draw process is related to the fact that the stretching is normally conducted at relatively high temperatures, i.e., approximating the softening point of the glass, because lower stresses can be utilized at those temperatures. This action, however, creates a problem with photochromic glass since the photochromic properties are quite sensitive to heat treatment. Haziness and slow fading are two commonly-experienced undesirable characteristics resulting from high temperature heating in the stretching procedure. A further problem witnessed in the re-draw process is the difficulty in controlling the shape and size of the product. The glass to be re-drawn is customarily in the form of small bars. It is well-nigh impossible to generate wide, uniformly-thin sheets of glass, such as would be useful in ophthalmic applications, because of the large reduction in glass body dimensions inherent in the re-draw process. Non-photochromic, silver-containing glasses can be made polarizing by stretching, thereby elongating the silver particles therein, but the same problems are experienced therewith as outlined above.

Extrusion as a forming method has been long recognized in the glass and ceramic arts for producing articles having an axis normal to a fixed cross axis. Extrusion has advantages of speed and ready control of article geometry when compared with a re-draw or stretching process. Accordingly, research has been initiated to develop a method for extruding glass compositions to generate polarizing properties therein.

The shaping of articles through the extrusion of molten glass is known to the arts. The basic element of the process is to force molten glass having a desired viscosity through the orifice of a die. In the more conventional systems, air pressure constitutes the force applied to move the glass through the orifice, although the use of mechanical means for exerting force on the molten glass is discussed in such literature as U.S. Pat. No. 3,467,513. The flow of glass is a function of its viscosity which, in turn, is a function of the temperature of the glass. Consequently, temperature control throughout the extrusion chamber is of vital signficance and particularly is this true in the area of the die aperture. Of somewhat less importance, but still of considerable moment, is regulation of the temperature of the glass subsequent to its leaving the die.

Different means have been proposed for applying heat to a die chamber. For example, U.S. Pat. No. 3,372,445 discloses the use of heating electrodes and U.S. Pat. No. 3,467,513 describes the generation of heat through the use of resistance windings. A rather sophisticated method for controlling the temperature in the die chamber is illustrated in U.S. Pat. No. 3,038,201 where a temperature gradient is produced therein to induce differential heating of the die. The application of fluid coolants to rigidify the extrudate as it leaves the die is noted in U.S. Pat. No. 2,423,260 and U.S. Pat. No. 3,796,532.

As has been explained above, one of the primary problems encountered in the stretching technique for preparing polarizing glasses has been the ready tendency of the silver or silver halide particles to spheroidize at high temperature. This phenomenon occurs because the particles act to minimize surface energy after being elongated. This occurrence is likewise a vital factor which must be faced in extruding glass.

OBJECTIVE OF THE INVENTION

The primary objective of the instant invention is to provide a method for extruding silver-containing photochromic and non-photochromic glasses such that the glasses will exhibit polarizing behavior, the photochromic glasses being polarizing when in the darkened state.

SUMMARY OF THE INVENTION

That objective can be achieved by extruding silver-containing glasses which are classified into two categories: first, glasses which have been melted under sufficiently reducing conditions to cause the precipitation of metallic silver particles as the molten batch is cooled to a glass body or through subsequent heat treatment of a glass body; and, second, glasses which exhibit photochromic behavior due to the presence therein of silver halide particles selected from the group of AgCl, AgBr, and AgI. The two types of glasses are extruded in accordance with the method parameters set out below such that the metallic silver and/or silver halide particles are elongated and aligned in the direction of glass movement. In general, the silver and silver halide particles prior to elongation have diameters within the range of about 80–1000 Å.

Inasmuch as the extrusion process is founded essentially solely upon the presence of compressive stresses and glass is extremely strong under compression, extrusion can be carried out at very high stress levels. This factor eliminates the problem of premature rupture encountered in the re-draw technique. Moreover, the polarizing character secured can also be superior because extrusion permits the use of higher stress levels. Finally, the shape and size of the extruded product can be very precisely controlled through design of the die.

The extrusion is conducted at such elevated temperatures that the glass is at a viscosity of between about $10^8$–$10^{13}$ poises, i.e., at temperatures between about the annealing point and the softening point of the glass, and at such pressures that the cross-sectional area of the glass in the extrusion chamber is reduced by a factor of at least 4 and up to 80 or more in the extrudate. Under the influence of those temperatures and pressures the silver and/or silver halide particles will be elongated to assume an oblate or prolate geometry with aspect ratios of at least 2:1 and up to 30:1 and greater.

Because of the tendency for the elongated particles to return to their original shape (respheroidize), the extrudate is cooled rapidly to freeze in the shape of the elongated particles. There are several means by which this can be accomplished. One is to conduct the extrusion at the lowest temperature possible (obviously requiring very high pressures) such that the rate of respheroidizing is quite slow as the extrudate leaves the die. Another is to maintain the extrudate in tension as its exits from the die by pulling on it. Yet another is to apply cooling fluid to the extrudate as it moves out of the die. Still another contemplates utilizing a temperature gradient die wherein the temperature of the extruded glass will be at about the annealing point thereof at the end of the extrusion process. At that temperature the glass is sufficiently rigid to maintain the elongated shape of the particles. Since the viscosity of the glass increases rapidly as the temperature thereof decreases, most of the elongation will be carried out at the upper end of the die where the temperature is high. The optimum extrusion conditions contemplate the stress on the glass being constant throughout the extrusion process, thereby preventing relaxation (respheroidization) of the elongated particles while the temperature of the glass is being reduced under the stress.

In the case of glasses containing metallic silver particles, the polarizing properties have been demonstrated to be due to the splitting of the absorption bands for the two different polarizations when the silver particles are elongated. The relationship between the polarizing properties and the amount of elongation has been worked out ("Selective Polarization of Light Due to Absorption by Small Elongated Silver Particles in Glass", S. D. Stookey and R. J. Araujo, *Applied Optics*, 7, No. 5 (1968), 777–9).

The mechanism through which the elongated silver halide particles provide a polarizing effect is not fully understood. As was observed above, U.S. Pat. No. 4,125,405 describes the production of glasses exhibiting polarizing properties resulting from the photolytic reduction of silver ions to metallic silver. It is believed that a similar phenomenon occurs with the present glasses when exposed to actinic radiation, customarily ultraviolet radiation. Thus, the photochromic glasses do not evidence polarizing effects except in the darkened state. Electron microscopic examinations of the elongated silver halide particles have indicated the presence of metallic silver specks on the surfaces thereof. Therefore, the polarizing properties are believed to be dependent not only upon the size, shape, and composition of the silver halide particles, but also the size, shape, and distribution of the silver specks photolytically deposited upon surfaces of the silver halide particles when the glass is in the darkened state.

Although the inventive method is operable with any glass composition wherein metallic silver particles can be precipitated during cooling of the molten batch to a glass body or through subsequent heat treatment of a glass body, phase-separable, alkali metal aluminoborosilicate base glass compositions are preferred. These glasses demonstrate the advantage of being easier to elongate because of their low interfacial energy. Typically, such compositions will consist essentially, in weight percent, of about 5–12% alkali metal oxide, 20–35% $B_2O_3$, 1–15% $Al_2O_3$, and the remainder $SiO_2$, with the proviso that where $Al_2O_3$ is present in amounts greater than about 5%, a specific phase separating agent such as CdO and/or F must be included in an amount of at least 1%. The silver content will customarily not exceed about 2%.

The inventive method appears to be operable essentially independently of the base composition of the photochromic glass so long as AgCl, AgBr, and/or AgI crystals comprise the photochromic agents.

For example, U.S. Pat. No. 3,208,860, the basic patent in the field of photochromic glasses, describes the manufacture of such from silicate-based glasses containing crystals selected from the group of AgCl, AgBr, and AgI. Although other photochromic agents are recognized in the literature, all the commercially-marketed glasses have relied upon the presence of silver halide crystals. Furthermore, the commercial glasses have commonly been prepared from base compositions in the alkali metal aluminoborosilicate system. Such glasses are referred to in U.S. Pat. No. 3,208,860 as constituting the preferred composition embodiment and the most desirable base glasses are stated to consist essentially, in weight percent, of 4–26% $Al_2O_3$, 4–26% $B_2O_3$, 40–76% $SiO_2$, and at least one alkali metal oxide selected from the group of 2–8% $Li_2O$, 4–15% $Na_2O$, 6–20% $K_2O$, 8-25% $Rb_2O$, and 10-30% $Cs_2O$. The glasses contain, as photochromic agents, by weight as chemically analyzed, at least one halogen in the minimum effective proportion of 0.2% chlorine, 0.1% bromine, and 0.08% iodine, and a minimum of silver in the indicated proportion of 0.2% where the effective halogen is chlorine, 0.05% where the effective halogen is bromine, but the glass contains less than 0.08% iodine, and 0.03% where the glass contains at least 0.08% iodine. The total of the base glass ingredients, silver, and halogens will constitute at least 85% by weight of the composition. Where a transparent glass is desired, the sum of the three halogens will not exceed 0.6% and the total silver will not exceed 0.7%.

Other patents disclosing photochromic glasses of varying base compositions, but employing silver halide crystals as the photochromic elements, which compositions are operable in the present inventive method are reported below. For example, U.S. Pat. No. 3,548,060 describes glasses having base compositions within the $RO-Al_2O_3-SiO_2$ system, viz., the glasses consist essentially, in weight percent, of 12-45% alkaline earth metal oxide, 2-35% $Al_2O_3$, and 30-86% $B_2O_3$. U.S. Pat. No. 3,703,388 records glasses having base compositions within the $La_2O_3-B_2O_3$ system, i.e., the glasses consist essentially in weight percent, of 15-75% $La_2O_3$ and 13-65% $B_2O_3$. U.S. Pat. No. 3,834,912 teaches glasses having base compositions within the $PbO-B_2O_3$ system, viz., the glasses consist essentially, in weight percent, of 14.2-48% $B_2O_3$, 29-73% PbO, 0-15% alkaline earth metal oxides, and 0-23% $ZrO_2$, $Al_2O_3$, and/or ZnO. U.S. Pat. No. 3,876,436 discloses glasses having base compositions within the $R_2O-Al_2O_3-P_2O_5$ field, i.e., the glasses consist essentially, in weight percent, of at least 17% $P_2O_5$, 9-34% $Al_2O_3$, not more than 40% $SiO_2$, not more than 19% $B_2O_3$, and at least 10% alkali metal oxides. U.S. Pat. No. 3,957,498 is drawn to glasses having base compositions within the $R_2O-Al_2O_3-SiO_2$ system, viz., the glasses consist essentially, in weight percent, of 13-21% alkali metal oxides, 17-25% $Al_2O_3$, and 45-56% $SiO_2$. Finally, U.S. Pat. No. 4,190,451 discloses glasses demonstrating exceptionally rapid darkening and fading rates coupled with relative temperature independence of the darkening and fading phenomena. Those glasses consist essentially, in weight percent, of 0-2.5% $Li_2O$, 0-9% $Na_2O$, 0-17% $K_2O$, 0-6% $Cs_2O$, 8-20% $Li_2O+Na_2O+K_2O+Cs_2O$, 14-23% $B_2O_3$, 5-25% $Al_2O_3$, 0-25% $P_2O_5$, 20-65% $SiO_2$, 0.004-0.02% CuO, 0.15-0.3% Ag, 0.1-0.25% Cl, and 0.1-0.2% Br, the molar ratio of alkali metal oxide:$B_2O_3$ ranging between about 0.55-0.85, where the composition is essentially free from divalent metal oxides other than CuO, and the weight ratio Ag:(Cl+Br) ranges about 0.65-0.95.

The preferred compositions for use in this embodiment of the inventive extrusion technique have base compositions within the alkali metal aluminoborosilicate field delineated in U.S. Pat. No. 3,208,860, supra, and the most preferred glasses (excellent polarization+good photochromic behavior) are those disclosed in U.S. Pat. No. 4,190,451, supra.

The flow of a charge in an extrusion chamber is not uniform. The center portion thereof flows more rapidly than the portion closer to the chamber wall because of friction with the wall. The orifice serves as a sink for the charge. The charge not only flows in the direction of the orifice but also at right angles thereto. This flow behavior can be varied by altering the die design and/or changing the materials for the chamber walls, e.g., low friction graphite vs. high friction metal. One consequence of these factors, however, is the capability of forming composite laminated structures via the concurrent extrusion of different glass compositions.

It is quite apparent that the temperatures utilized in the extrusion process are dependent upon glass composition and the pressure applied to the charge of glass. In general, however, operable temperatures range between about 400°-1100° C. with 500°-700° C. being suitable for the majority of phase-separable, alkali metal aluminoborosilicate glasses and the commercially-marketed photochromic glasses. As was noted earlier, because glass is extremely strong under compression, there is essentially no limit to the pressure that can be applied, the only restriction being the strength of the extrusion chamber materials. To insure substantial elongation of the silver metal and/or silver halide particles, applied pressures of at least 3000 psi have been utilized, with 5000-50,000 psi being preferred. The use of 500,000 psi applied pressure has been deemed a practical maximum.

As has been observed above, heat treatments applied to the extruded products can result in respheroidization of the elongated particles. For example, exposure of the extrudate for one-half hour to a temperature at the annealing point of the glass causes essentially all of the particles to return to their original shape. This factor has led to difficulties in reshaping extrudates to products of desired geometries utilizing conventional glass forming methods carried out at elevated temperatures. Thus, the heating required for reshaping (temperatures in vicinity of the softening point of the glass) can cause a loss of polarization. This circumstance is especially relevant in the field of ophthalmic applications, particularly sunglasses, where the shaping of lenses with minimum grinding and polishing is desired because of cost considerations.

The instant invention provides a method for extruding a lens shape. Hence, a concavo-convex configuration can be achieved by extruding glass through a die having a curved slot orifice and bending the extruded ribbon or strip slightly after it leaves the orifice. Laboratory investigations have indicated that the glass in the center of the ribbon has to flow about 4% more rapidly than the glass at the edges. Furthermore, one side of the ribbon has to flow about 2% faster than the other. Inasmuch as the edges of the ribbon tend to flow more slowly because of greater impedance to flow near the ends of the slot orifice, a small differential in flow rate is necessary. Such can be readily achieved through temperature control within the die chamber.

DESCRIPTION OF THE PREFERRED EMBODIMENT

Figure 1:
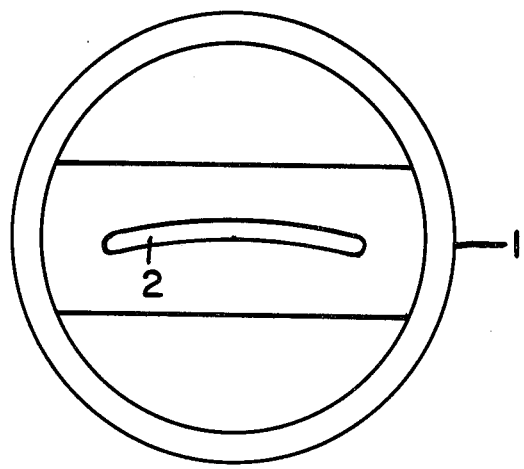
FIG. 1 is a schematic representation of a top plan view of a die structure illustrating the curved slot orifice thereof.

Table I records several glass compositions, expressed in parts by weight on the oxide basis, which were utilized in carrying out the inventive method. Because the total of the individual components closely approximates 100, for all practical purposes the recorded values can be considered to reflect weight percent. Since it is not known with which cation(s) the halogens are combined, they are simply listed as halides, in accordance with conventional glass analysis practice. Furthermore, inasmuch as the amounts of silver are so small, they are merely tabulated as Ag.

The actual batch ingredients may comprise any materials, either oxides or other compounds, which, when melted together with the other components, will be converted to the desired oxide in the proper proportions. The batch ingredients were compounded, ball-milled together to aid in securing a homogeneous melt, and then charged into crucibles. Where a glass containing metallic silver particles is desired (Example 15), starch or sugar is included in the batch to create reducing conditions. The crucibles were covered, introduced into a furnace operating at about 1300°–1450° C., and the batches melted for about four hours. The melts were poured into steel molds to form slabs about 6"×6"×½" and the slabs immediately transferred to an annealer operating at about 450° C.

TABLE I

|  | 1 | 2 | 3 | 4 | 5 | 6 | 7 | 8 |
|---|---|---|---|---|---|---|---|---|
| $SiO_2$ | 58.6 | 58.6 | 58.6 | 51.8 | 51.8 | 55.3 | 56.46 | 56.46 |
| $B_2O_3$ | 18.3 | 18.3 | 18.3 | 31.0 | 31.0 | 27.1 | 18.15 | 18.15 |
| $Al_2O_3$ | 9.51 | 9.53 | 9.53 | 7.8 | 7.8 | 8.41 | 6.19 | 6.19 |
| $Li_2O$ | 1.86 | 1.86 | 1.86 | — | — | — | 1.81 | 1.81 |
| $Na_2O$ | 2.95 | 2.7 | 2.7 | 9.2 | 9.2 | 8.8 | 4.08 | 4.71 |
| $K_2O$ | 9.77 | 9.76 | 9.76 | — | — | — | 5.72 | 5.72 |
| Ag | 0.32 | 0.36 | 0.36 | 0.18 | 0.27 | 0.18 | 0.207 | 0.240 |
| CuO | 0.016 | 0.012 | 0.012 | — | — | — | 0.006 | 0.007 |
| Cl | 0.30 | 0.299 | 0.299 | 0.52 | 0.52 | 0.48 | 0.166 | 0.237 |
| Br | 0.154 | 0.146 | 0.146 | 1.2 | 1.2 | 1.07 | 0.137 | 0.137 |
| CdO | — | — | — | 0.18 | 0.18 | 0.15 | — | — |
| $TiO_2$ | — | — | — | — | — | — | 2.07 | 1.03 |
| $ZrO_2$ | — | — | — | — | — | — | 4.99 | 7.13 |

|  | 9 | 10 | 11 | 12 | 13 | 14 | 15 |
|---|---|---|---|---|---|---|---|
| $SiO_2$ | 58.6 | 50.1 | 50.2 | 58.6 | 57.0 | 57.0 | 72.0 |
| $B_2O_3$ | 18.3 | 21.1 | 21.1 | 18.3 | 18.4 | 18.4 | — |
| $Al_2O_3$ | 9.5 | 5.2 | 5.2 | 9.51 | 6.95 | 6.94 | 2.0 |
| $Li_2O$ | 1.86 | 1.56 | 3.07 | 1.86 | 1.81 | 1.81 | — |
| $Na_2O$ | 2.95 | 1.06 | 0.47 | 2.95 | 1.25 | 1.25 | 18.0 |
| $K_2O$ | 9.77 | 9.7 | 9.7 | 9.77 | 10.41 | 10.41 | — |
| Ag | 0.32 | 0.278 | 0.279 | 0.24 | 0.24 | 0.24 | 0.007 |
| CuO | 0.012 | 0.009 | 0.009 | 0.012 | 0.012 | 0.012 | — |
| Cl | 0.3 | 0.45 | 0.45 | 0.3 | 0.3 | 0.3 | — |
| Br | 0.154 | 0.176 | 0.176 | 0.154 | 0.06 | — | — |
| CaO | — | — | — | — | — | — | 8.0 |
| $ZrO_2$ | — | 10.03 | 10.04 | — | 4.98 | 4.98 | — |
| PbO | — | — | — | 0.12 | — | — | — |
| $Bi_2O_3$ | — | — | — | — | — | — | 0.01 |
| $SnO_2$ | — | — | — | — | — | — | 0.2 |
| Sugar | — | — | — | — | — | — | 2.0 |

Table II reports the time and temperature to which Examples 1–11 were subjected to develop photochromic properties therein. Example 15 comprises a phase-separable, non-photochromic glass which, being melted under strongly reducing conditions, contains metallic silver particles. Examples 1–11 were subjected to the recited heat treatments to induce photochromism therein and thereafter a 1" diameter disc was cut from each slab. Those discs, plus a similarly-sized disc cut from the slab of Example 15, were extruded into 0.25" rods utilizing a temperature of about 600° C. and an applied pressure of about 25,000 psi to produce a reduction ratio of 16. Electron microscopic examination showed the particles to have a prolate geometry and indicated the average aspect ratio demonstrated by the elongated metallic silver and silver halide particles to range from about 2:1 to greater than 30:1, with the preferred ratio for the metallic silver particles being about 3:1 and that of the silver halide particles being in the interval of about 6:1–9:1.

Specimens were cut from the extruded rods, each side of the specimens ground and polished to a thickness of about 1.5 mm, and Examples 1–11 were exposed to radiation emanating from the solar simulator described in U.S. Pat. No. 4,125,775 to place the samples in the darkened state. The polarization character of each specimen was examined utilizing a spectrophotometer adapted with a polarizer and a rotatable sample holder. The dichroic ratio exhibited by each sample and the wavelength at which the measurement was made are tabulated along with the polarization efficiency of the sample at that wavelength.

TABLE II

| Example | Photochromism Temp. | Photochromism Time | Dichroic Ratio 0.55μm | Polar Efficiency 0.55μm |
|---|---|---|---|---|
| 1 | 720° C. | 20 min. | 1.92 | 57% |
| 2 | 700° C. | 20 min. | 2.02 | 40% |
| 3 | 720° C. | 20 min. | | |
|   | 700° C. | 20 min. | 1.92 | 56% |
| 4 | 720° C. | 20 min. | | |
|   | 650° C. | 0.5 hr. | 2.5 | 58% |
| 5 | 650° C. | 0.5 hr. | 2.8 | 51% |
| 6 | 650° C. | 0.5 hr. | 2.2 | 70% |
| 7 | 660° C. | 1 hr. | 1.97 | 43% |
| 8 | 660° C. | 1 hr. | 2.04 | 64% |
| 9 | 700° C. | 20 min. | 2.14 | 67% |
|   | 720° C. | 20 min. | | |
| 10 | 700° C. | 35 min. | 2.0 | 40% |
| 11 | 700° C. | 30 min. | 2.14 | 54% |
| 15 | 700° C. | 1 hr. | 6.0 | 85% |

As can be seen from a study of Tables I and II, the composition of the glasses appears to have little effect upon the dichroic ratio exhibited. It will be appreciated, of course, that composition changes influence the particle size for any selected heat treatment schedule such that the proper heat treatment to develop particles of the necessary size for satisfactory elongation must be determined empirically. Such practice is fully within the ingenuity of the worker of ordinary skill in the art. Inherent differences in viscosities of varying glass compositions also affect the extrusion parameters.

Finally, it has been observed that, where the polarizing particles assume an oblate rather than a prolate configuration, higher (up to 5.0) dichroic ratios can be achieved. Thus, the average dichroic ratio observed with prolate-shaped particles falls within the interval of about 1.8–3.0. Table III illustrates this practice.

Examples 7, 12, 13, and 14 were subjected to the reported heat treatments to induce photochromism therein after whch a 1" diameter disc was cut from each slab. Those discs were extruded in a manner to obtain oblate-shaped particles which were aligned perpendicularly to the wide measure of the extrudate. Specimens were cut from the extrudate, ground and polished to a thickness of about 1.5 mm, and subsequently exposed to radiation being emitted from the solar simulator disclosed in U.S. Pat. No. 4,125,775, supra. The polarization behavior of each sample was measured in like manner to that described above with respect to Table II.

TABLE III

| Example | Photochromism Temp. | Time | Dichroic Ratio 0.55μm | Polar. Efficiency 0.55μm |
|---|---|---|---|---|
| 7 | 720° C. | 80 min. | 3.1 | 49% |
| 12 | 720° C. | 45 min. | 4.2 | 71% |
| 13 | 720° C. | 45 min. | 4.1 | 74% |
| 14 | 720° C. | 45 min. | 3.2 | 64% |

As was explained above, the instant invention contemplates a method for extruding glass to yield a ribbon or strip extrudate exhibiting a concavo-convex configuration. The glass ribbon can then be cut into segments useful as precursors for ophthalmic lenses. Because of the curved geometry of these segments, the amount of grinding and polishing required to produce the desired lens shape is substantially reduced. The method is described with the aid of FIGS. 1-4.

Figure 2:
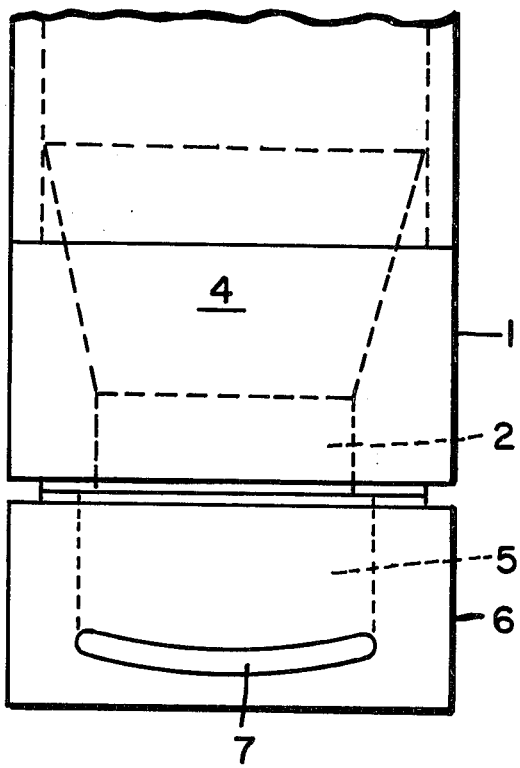
FIG. 2 represents a side view of a die structure connected to a block having a channel therein facing the orifice of said channel.
Figure 3:
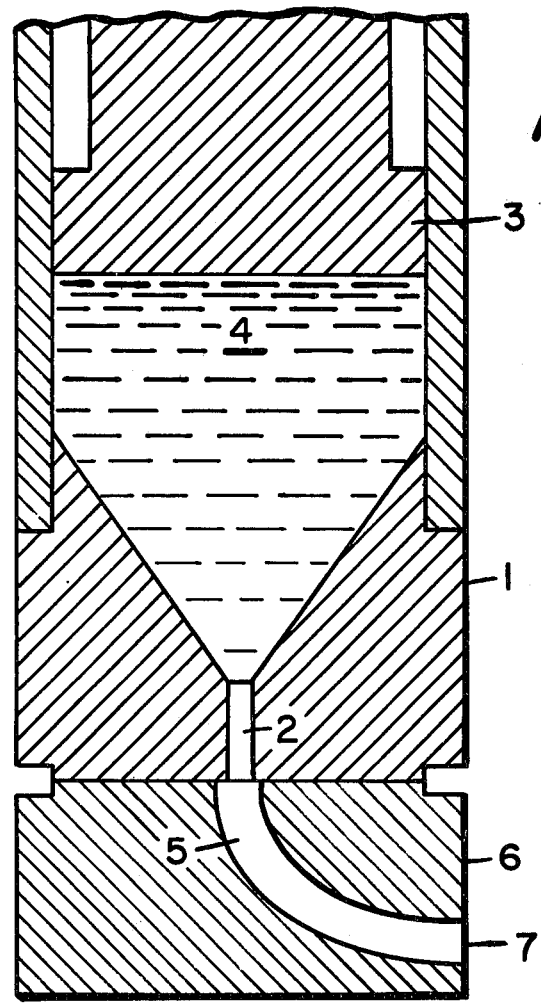
FIG. 3 represents a cross section of a die assembly attached to a block taken through the orifice of the die and illustrating the channel illustrating the curved channel in said block.
Figure 4:
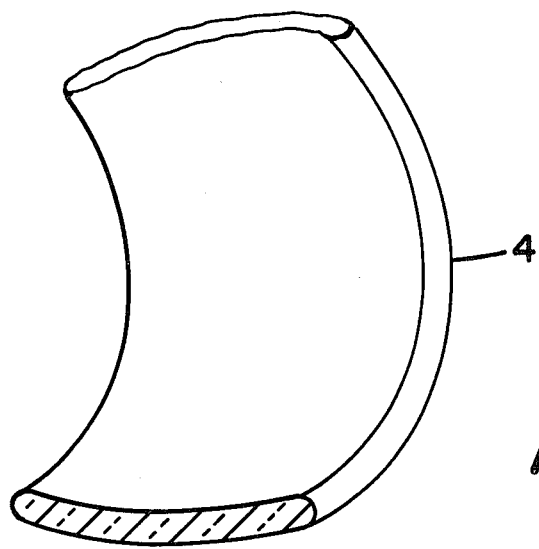
FIG. 4 represents a section of glass extrudate formed utilizing the die and block apparatus depicted in FIGS. 1-3.

FIG. 1 represents a top plan view of a die assembly 1 illustrating a curved slot orifice 2 through which the molten glass will be extruded. FIG. 3 represents a side view of a cross section of die assembly 1 attached to block 6 depicting slot orifice 2, piston 3, and molten glass 4 contained within the die chamber. As piston 3 is lowered, molten glass 4 is forced through slot orifice 2 into channel 5 of block 6 and exits through orifice 7. Channel 5 has a cross-sectional configuration similar to that of slot orifice 2. FIG. 2 represents a side view of die assembly 1 and block 6 facing orifice 7, illustrating the curved slot configuration thereof. FIG. 4 represents the configuration of glass 4 as a solid extrudate exiting through orifice 7.

In carrying out the method, glass particles are placed into die structure 1 which structure is heated via an induction coil (not shown). When the glass 4 becomes molten to a desired viscosity, piston 3 is applied to the top surface thereof which forces glass 4 through the slot orifice 2 of die structure 1 into channel 5 of block 6. Channel 5 has a cross-sectional configuration approximating that of slot orifice 2 but of slightly larger measurements. The curvature of channel 5 imparts a slight bend to the extrudate. Block 6 acts in the manner of a heat sink such that molten glass 4 is chilled to a solid extrudate shortly after it enters channel 5. FIG. 4 illustrates the concavo-convex configuration across the width plus the linear curvatures of the glass strip resulting from the inventive extrusion technique.

We claim:

1. A method for making glass exhibiting polarizing properties from silver-containing glasses characterized as containing particles of metallic silver and/or as being photochromic through the presence of silver halide particles therein selected from the group of AgCl, AgBr, and AgI, which comprises the steps of:
   (a) extruding said glass at an elevated temperature between about the annealing and softening points of the glass at an applied pressure of at least 3000 psi to elongate said metallic silver and/or silver halide particles to an aspect ratio of at least 2:1 and align them in the direction of glass flow; and then
   (b) subjecting the extrudate to conditions sufficient to inhibit respheroidization of the elongated particles.

2. A method according to claim 1 wherein the extrusion is carried out at a temperature between about 400°-1100° C.

3. A method according to claim 1 wherein the extrusion is carried out at an applied pressure of about 5000-500,000 psi.

4. A method according to claim 1 wherein said particles after extrusion exhibit a prolate shape and said glass demonstrates a dichroic ratio of about 1.8-3.0.

5. A method according to claim 1 wherein said particles after extrusion exhibit an oblate shape and said glass demonstrates a dichroic ratio of about 1.8-5.0.

6. A method according to claim 1 wherein respheroidization of the elongated particles is inhibited by quickly cooling the extrudate.

7. A method according to claim 1 wherein respheroidization of the elongated particles is inhibited by utilizing a temperature gradient extrusion die.

8. A method according to claim 1 wherein respheroidization of the elongated particles is inhibited by maintaining the extrudate under tension during cooling.

9. A method for making glass strip exhibiting polarizing properties from silver-containing glasses characterized as containing particles of metallic silver and/or as being photochromic through the presence of silver halide particles therein selected from the group of AgCl, AgBr, and AgI, said strip having a concavo-convex configuration across the width thereof and a linear curvature therein, which comprises the steps of:
   (a) extruding said glass at an elevated temperature between about the annealing and softening points of the glass at an applied pressure of at least 3000 psi to elongate said metallic silver and/or silver halide particles to an aspect ratio of at least 2:1 and align them in the direction of glass flow, said extrusion being carried out utilizing a die structure having a curved slot orifice;
   (b) passing said glass into a channel having a cross-sectional configuration similar to that of said curved slot orifice and having a bend therein to form a glass strip having a concavo-convex configuration across the width thereof and a linear curvature therein; and then
   (c) subjecting said glass strip to conditions sufficient to inhibit respheroidization of the elongated particles.

* * * * *